United States Patent [19]

Reitan

[11] 4,273,525
[45] Jun. 16, 1981

[54] INJECTION MOLD BUSHING

[75] Inventor: David M. Reitan, Keene, N.H.

[73] Assignee: Incoe Corporation, Troy, Mich.

[21] Appl. No.: 21,155

[22] Filed: Mar. 16, 1979

Related U.S. Application Data

[63] Continuation of Ser. No. 870,849, Jan. 19, 1978, abandoned.

[51] Int. Cl.³ .............................................. B29F 1/08
[52] U.S. Cl. .................................... 425/549; 425/567; 425/571
[58] Field of Search ............... 425/548, 547, 549, 567, 425/568, 571

[56] References Cited

U.S. PATENT DOCUMENTS

| | | |
|---|---|---|
| 2,456,423 | 12/1948 | Jobst . |
| 2,461,282 | 2/1949 | Jobst . |
| 2,804,649 | 9/1957 | Hupfield . |
| 3,010,156 | 11/1961 | Smith . |
| 3,189,948 | 6/1965 | Whitney ........................ 425/548 X |
| 3,577,597 | 5/1971 | Draudt . |
| 3,632,260 | 1/1972 | Moslo ........................... 425/549 X |
| 3,661,487 | 5/1972 | Susin .................................. 425/548 |
| 3,669,596 | 6/1972 | Savory ........................... 425/549 X |
| 3,716,318 | 2/1973 | Erik . |
| 3,767,340 | 10/1973 | Driscoll . |
| 3,797,984 | 3/1974 | Yago ............................... 425/549 X |
| 3,819,312 | 6/1974 | Arpajian . |
| 3,822,856 | 7/1974 | Gellert .............................. 425/549 |
| 3,945,535 | 3/1976 | Leiste . |
| 3,966,372 | 6/1976 | Yasuike . |

FOREIGN PATENT DOCUMENTS 47-21451 10/1972 Japan .
1535164 12/1978 United Kingdom .................... 425/548

Primary Examiner—Thomas P. Pavelko
Attorney, Agent, or Firm—Harness, Dickey & Pierce

[57] ABSTRACT

An injection mold bushing which is mounted on the mold and is adapted for sprueless molding. The construction comprises an inner shank and an outer body between which is mounted a heating element for independently controlling the heat at each gate. The material passage is straight and centrally located, minimizing the likelihood of material collecting and degrading in the passage, and making it simple to clear this passage if material build-up occurs. The location of the heater and insulating construction around the bushing insures that the mold will be uniformly cool relative to the material, minimizing distortion of the molded parts.

15 Claims, 1 Drawing Figure

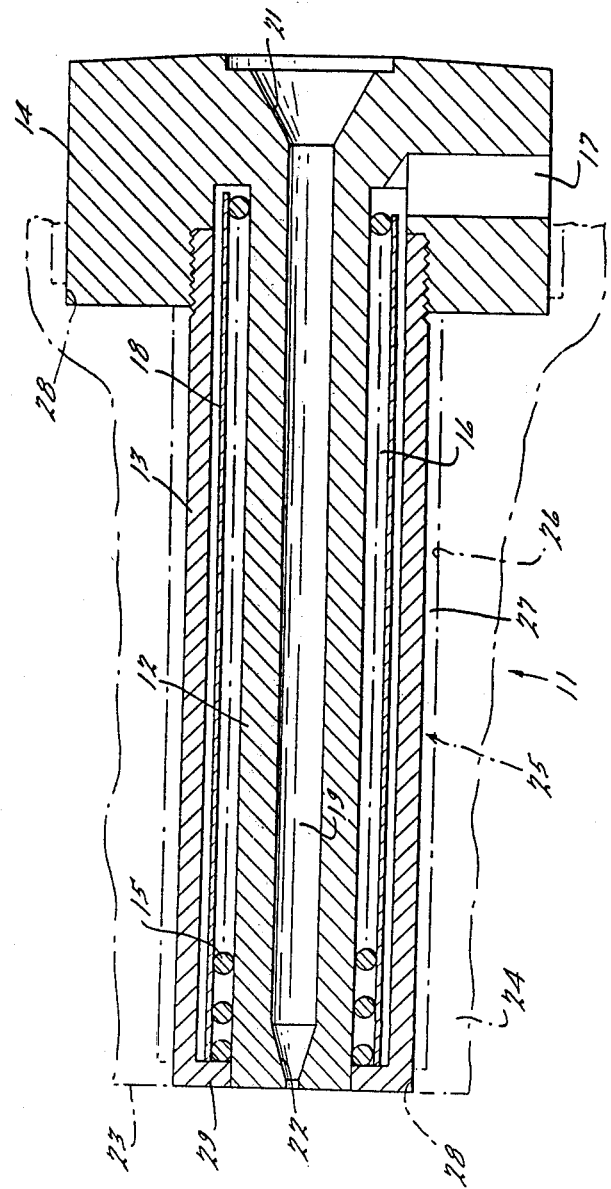

INJECTION MOLD BUSHING

This is a continuation of application Ser. No. 870,849, filed Jan. 19, 1978, now abandoned.

BACKGROUND OF THE INVENTION

1. Field of the Invention

The invention relates to injection molding, and particularly to heated bushings which are mounted on the mold providing the possibility of multi-gate locations without the use of runners.

2. Description of the Prior Art

It is known to have a bushing with a central passage and an external heater disposed between the bushing and the mold. However, this is a bulky and cumbersome construction and the excessive heat transfer to the mold could cause distortion of the product. Moreover, the time needed for the steel mold to cool down between cycles lengthened the cycle time.

Yago U.S. Pat. No. 3,797,984 shows a cold sprue injection molding device with an integral sprue chamber and injection nozzle. While this patent is pertinent in that is shows several isolated features of the invention, the Yago system is part of the machine and not an integral part of the mold. Thus, only a single injection point can be accomplished at the price of an expensive apparatus.

Other pertinent patents found in a search are Hendry U.S. Pat. No. 2,746,089, Kelley U.S. Pat. No. 2,911,680 and Putkowski U.S. Pat. No. 3,677,682. While these patents also show isolated elements of the present invention, such as a central passage or an insulating air gap, they fail to teach the entire combination recited in the present claims, nor do they have the advantages of this invention.

BRIEF SUMMARY OF THE INVENTION

It is an object of the present invention to provide a straight flow injection mold bushing which is independent of the machine barrel and screw, permitting the use of multiple gates or bushings in the mold with each gate being individually controlled for heat.

It is a further object to provide a bushing of this character in which the flow passage is not interrupted by a spreader or torpedo, thus lessening the possibility of the resin degrading or breaking down, which could cause discoloration or create shear stress on the molded part.

It is also an object to provide a novel and improved injection mold bushing as above described, in which a central material passage is surrounded by a heater but the arrangement insures that the mold will be uniformly cool relative to the material, thus minimizing distortion of the molded parts.

Briefly, the injection mold bushing of this invention comprises an elongated shank, an annular body surrounding and spaced outwardly from said shank, an end support carrying said shank and body, a heater located between said shank and body, a central material passage through said support and shank, and a bore in said mold for receiving said body, said bore having portions tightly fitting with the outer surface of said body and other portions spaced outwardly from the surface of said body to create heat insulating areas.

BRIEF DESCRIPTION OF THE DRAWINGS

The FIGURE is a longitudinal cross-sectional view showing the construction of the bushing of this invention and the adjacent portion of the mold.

DESCRIPTION OF THE PREFERRED EMBODIMENT

The bushing is generally indicated at 11 and comprises an elongated shank 12 surrounded by an annular body 13. These elements are carried by a support 14, this support being integral with shank 12, body 13 being threadably mounted in the support. A coil heater 15 is disposed in the space 16 between the body and shank, this heater being in contact with the main outer surface of the shank. The support has a transverse passage 17 for the heater leads. A tube 18 surrounds heater coil 15 and is spaced inwardly from body 13.

A central material passage 19 is formed in shank 12 and support 14. The end of this passage at the entrance to support 14 is enlarged as indicated at 21 for the reception of the member which supplies the material. The exit end 22 of passage 19 is tapered and reaches to the mold cavity 23.

The mold is indicated partially at 24 and has a bore generally indicated at 25 for receiving the assembly comprising the body and shank with their associated parts. This bore 25 has recessed portions 26 which create a heat insulating space 27 between the bushing and the mold. Other portions 28 of bore 25 have a tight fit with respect to the outer surfaces of members 13 and 14 to support the bushing. Body 13 has inwardly extending portions 29 at the exit end of the bushing to support shank 12. The body thus has two functions, namely to support the internal portions of the bushing and also to provide heat insulation due to spaces 16 and 26.

The straight flow configuration of the material passage will eliminate the possibility of material hanging up or degrading at corners, a feature which is especially important when different material colors are used, since this will promote uniformity of color and prevent streaking. The central passage arrangement also will reduce physical shear or tearing up of material, otherwise referred to as degradation. Degradation of material is also minimized by the fact that there will be a minimum of temperature differential or thermal gradient of the material as it passes through the bushing. This thermal gradient in prior constructions has caused degradation of material, and if the degraded material peels or flakes off it might, in these prior constructions, enter the mold cavity and contaminate the material injected therein. The central location of the material passage will of course facilitate clearing of material which may accumulate therein after prolonged use. At the same time, the location of the heater and insulating air spaces will maintain uniform coolness of the mold relative to the material, thus minimizing part distortion.

Suitably, bushing 11 can be dimensioned so as to enable it to replace a single cavity cold sprue bushing which is an accepted standard in the industry, thus minimizing the conversion expense.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

I claim:

1. A hot sprue bushing adapted to be mounted in a mold part, said bushing having a head portion at the rearward end thereof, a material passage extending in substantially a straight path entirely therethrough from the rearward end to the forward end thereof, and an annular heat insulating space surrounding and spaced radially outwardly from said passage; and heater means in said annular space in heat exchange relation with the inner annular wall thereof, said material passage having an inlet opening through the rearward end of said head portion and an outlet having a tapered section terminating in a material discharge orifice opening through the forward end of said bushing, the rearward terminal portions of said annular space and of said heater means extending into said head portion but terminating short of the rearward end of the latter, said head providing a relatively large metallic mass having substantial strength to withstand forces imposed thereon in use by material in said passage and said head further adapted to be heated in use by the portion of said heater means disposed therein and defining a heat sink for heating the portion of said passage and material therein extending axially rearwardly beyond said heater means, the forward terminal portions of said annular space and of said heater means at least partially overlapping said tapered section, and the portion of said bushing disposed forwardly of said heater and of said annular space providing a direct radial heat flow path between the mold and said orifice whereby to permit coolant conventionally circulated through the mold to freeze material in said orifice during removal of a part from said mold while permitting said heater to maintain material in said outlet behind said orifice and in said passage in a fluid condition.

2. The sprue bushing as defined in claim 1 wherein the forward terminal portions of said annular space and of said heater means overlap at least a substantial portion of said tapered section.

3. A sprue bushing as defined in claim 1 wherein said head portion is provided with a duct extending radially outwardly from substantially the rearward end portion of said annular space to accommodate electric leads for said heater means.

4. A sprue bushing as defined in claim 1 including means defining a second elongate, annular, heat insulating space surrounding said first mentioned heat insulating space and said material passage.

5. The sprue bushing as defined in claim 1 wherein the portion of said bushing extending forwardly of said head portion comprises an inner shank, and a removable outer tubular body, said shank and said tubular body being spaced radially apart for at least a portion of their length and defining said annular heat insulating space, the outer tubular body being provided at the forward end thereof with a radially inwardly extending annular flange disposed radially in-line with the outlet of said material passage, said annular flange receiving and snugly fitting said shank and defining said radial heat flow path, the outer radial surface of said flange being disposed substantially flush with the end surface of said shank, and the mentioned surface of said flange being adapted to be positioned contiguous to the wall of the mold cavity adjacent to the hole in which said bushing is mounted, whereby the mentioned surface of said flange and said shank collectively form a portion of said cavity wall.

6. A sprue bushing as defined in claim 1 wherein the portion of said bushing extending forwardly of said head portion comprises an inner shank, and a removable outer tubular body, said shank and said tubular body being spaced radially apart for at least a portion of their length and defining said annular heat insulating space.

7. The sprue bushing as defined in claim 6 wherein said outer tubular body is provided at the forward end thereof with a radially inwardly extending annular flange disposed radially in-line with the outlet of said material passage that receives and snugly fits said shank, and wherein said flange defines said radial heat flow path.

8. A hot sprue bushing adapted to be mounted in a mold, said bushing having a head portion at the rearward end thereof, a material passage extending in substantially a straight path entirely therethrough from the rearward end to the forward end thereof, and an annular heat insulating space surrounding and spaced radially outwardly from said passage;

heater means in said annular space in heat exchange relation with the inner annular wall thereof, said material passage having an inlet opening through the rearward end of said head portion and an outlet having a tapered section terminating in a material discharge orifice opening through the forward end of said bushing, the rearward terminal portions of said annular space and of said heater means extending into said head portion but terminating short of the rearward end of the latter and the forward terminal portions of said annular space and of said heater means overlapping at least a portion of the tapered section of said material passage, said head providing a relatively large metallic mass having substantial strength to withstand forces imposed thereon in use by material in said passage and said head further adapted to be heated in use by the portion of said heater means disposed therein and defining a heat sink for heating the portion of said passage and material therein extending axially rearwardly beyond said heater means;

cooling means disposed axially forwardly of said annular heat insulating space and radially outwardly of said orifice providing a direct radial heat flow path between the mold and said orifice; and means including the combination of said heater means and said cooling means and the relationship thereof to each other and to said outlet adapted to permit coolant conventionally circulated in use through the mold to freeze material in said orifice during removal of a part from said mold while maintaining said material in fluid condition in said outlet behind said orifice and in said passage.

9. A hot sprue bushing adapted to be mounted in a mold, said bushing having a material passage extending in substantially a straight path entirely therethrough from the rearward end to the forward end thereof, said material passage having an inlet opening through the rearward end of said bushing and an outlet having a tapered section terminating in a material discharge orifice opening through the forward end of said bushing;

an annular heat insulating space surrounding and spaced radially outwardly from said passage;

heater means in said annular space in heat exchange relation with the inner annular wall thereof and at least partially overlapping said tapered section at the forward end thereof;

means disposed forwardly of said annular heat insulating space and radially outwardly of said orifice providing a direct radial heat flow path between the mold and said orifice; and means including the combination of said heater means and said last mentioned means and the relationship thereof to each other and to said outlet being adapted to permit coolant conventionally circulated in use through the mold to freeze material in said orifice during removal of a part from said mold while maintaining said material in said outlet behind said orifice and in said passage in fluid condition.

10. A hot sprue bushing adapted to be mounted in a mold, said bushing having a material passage extending in substantially a straight path entirely therethrough from the rearward end to the forward end thereof, and an annular heat insulating space surrounding and spaced radially outwardly from said passage; and heater means in said annular space in heat exchange relation with the inner annular wall thereof, said material passage having an inlet opening through the rearward end of said bushing and an outlet having a tapered section terminating in a material discharge orifice opening through the forward end of said bushing, the forward terminal portion of said bushing providing a direct radial heat flow path between the mold and said orifice which subjects material in said orifice to the effect of coolant conventionally circulated through the mold, the forward end of said heater means being disposed rearwardly of said orifice and at least partially overlapping said tapered section but sufficiently close to said orifice so that the combined effects of said heater means and of said coolant acting on the material in said outlet through said forward terminal portion of said bushing and said heat flow path freezes the material in said orifice during removal of a part from said mold while maitaining said material in said outlet behind said orifice and in said passage in a fluid condition.

11. A hot sprue bushing adapted to be mounted in a mold, said bushing having a head portion at the rearward end thereof, a material passage extending in substantially a straight path entirely therethrough from the rearward end to the forward end thereof, and an annular heat insulating space surrounding and spaced radially outwardly from said passage;

heater means in said annular space in heat exchange relation with the inner annular wall thereof, said material passage having an inlet opening through the rearward end of said head portion and an outlet having a tapered section terminating in a material discharge orifice opening through the forward end of said bushing, the rearward terminal portions of said annular space and of said heater means extending into said head portion but terminating short of the rearward end of the latter, said head providing a relatively large metallic mass having substantial strength to withstand forces imposed thereon in use by material in said passage and said head further adapted to be heated in use by the portion of said heater means disposed therein and defining a heat sink for heating the portion of said passage and material therein extending axially rearwardly beyond said heater means, the forward terminal portion of said bushing providing a direct radial heat flow path between the mold and said orifice which subjects material in said orifice to the effect of coolant conventionally circulated through the mold, the forward end portion of said heater means being disposed rearwardly of said orifice and at least partially overlapping the tapered section of said material passage but sufficiently close to said orifice so that the combined effects of said heater means and of said coolant acting on the material in said outlet through said forward terminal portion of said bushing and said heat flow path freezes the material in said orifice during removal of a part from said mold while maintaining said material in said outlet behind said orifice and in said passage in a fluid condition.

12. The sprue bushing as defined in claim 11, the portion of said bushing extending forwardly of said head portion comprising an inner shank portion, and a removable outer tubular body portion, said shank and said tubular body portion being spaced radially apart for at least a portion of their length and defining said annular heat insulating space.

13. The sprue bushing as defined in claim 12 further provided with means for providing a second elongate, annular heat insulating space between said outer tubular body portion and said mold part.

14. A hot sprue bushing adapted to be mounted in a mold part, said bushing having a material passage extending in substantially a straight path entirely therethrough from the rearward end to the forward end thereof, and an annular heat insulating space surrounding and spaced radially outwardly from said passage; and heater means in said annular space in heat exchange relation with the inner annular wall thereof, said material passage having an inlet opening through the rearward end of said bushing and an outlet having a tapered section terminating in a material discharge orifice opening through the forward end of said bushing, the forward terminal portions of said annular space and of said heater means overlapping at least a portion of the tapered section of said material passage and terminating behind but adjacent to said discharge orifice whereby heat from said terminal portion of said heater means overlaps at least a portion of said tapered section, the portion of said bushing disposed forwardly of said heater and of said annular space providing a direct radial heat flow path between the mold and said orifice whereby coolant conventionally circulated through the mold freezes material in said orifice during removal of a part from said mold while permitting said heater to maintain material in said outlet behind said orifice and in said passage in a fluid condition.

15. The sprue bushing as defined in claim 14 wherein the forward terminal portions of said annular space and of said heater means overlap at least a substantial portion of said tapered section.

* * * * *